United States Patent Office.

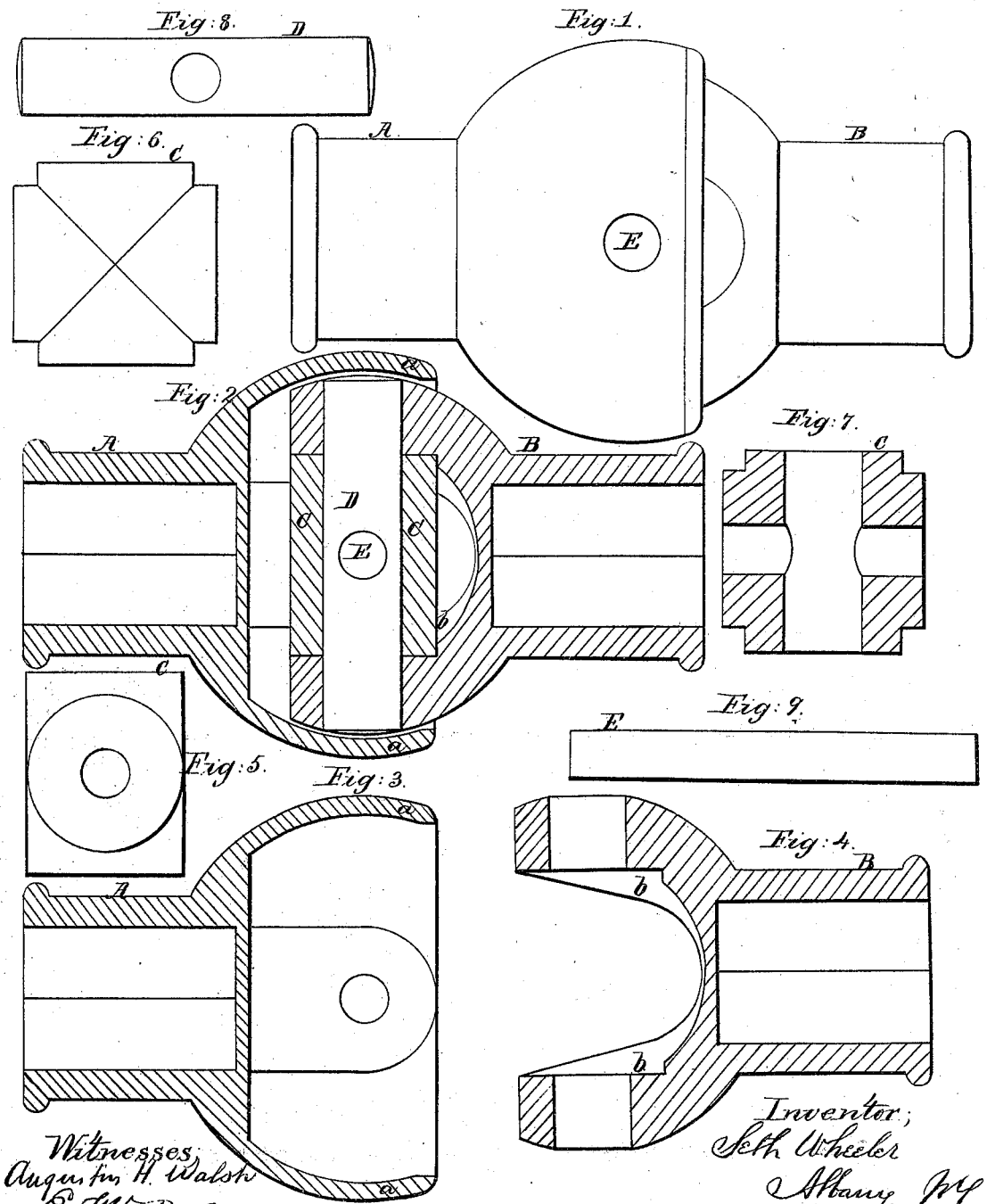

SETH WHEELER, OF ALBANY, NEW YORK.

Letters Patent No. 97,575, dated December 7, 1869.

IMPROVED SHAFT-COUPLING.

The Schedule referred to in these Letters Patent and making part of the same.

*To all whom it may concern:*

Be it known that I, SETH WHEELER, of Albany, in the county of Albany, and State of New York, have invented a new and improved Articulating Shaft-Coupling; and I do hereby declare that the following is a full and exact description thereof, reference being had to the accompanying drawings, and to the letters of reference marked thereon.

This invention relates to certain novel improvements on shaft-couplings, which are used for connecting driving or driver-shafts, that are required to rotate when arranged at obtuse angles to each other.

Various forms of articulating couplings have been devised, but none have given so general satisfaction, as to easy transmission of power, as the device known as "Hook's universal joint." Their use, however, is attended with much danger, particularly when used for driving threshing-machinery, where they are arranged along the ground, owing to the certainty of their projecting parts entangling the clothes of the workmen, if they chance to pass near enough to them. Indeed, so dangerous are they considered, and so frequent the accidents occurring through their use, that the Legislatures of some of the larger grain-producing States have enacted laws, compelling parties using them about threshing-machinery to enclose them in suitable boxing. But, owing to the difficulty and time required to secure the boxing properly at every setting of the machine, they are looked upon by the threshing-community with much disfavor.

In my improved coupling, the principle of the "Hook joint" is retained, but all danger of accident obviated, its strength greatly increased, and appearance much improved.

The nature of my invention consists in so constructing the "Hook joint" that its parts may be enclosed in a case, the outer surface of which presents a plain surface, (or nearly so,) thus forming a most perfect and simple boxing, and always in position. And while I prefer, in most instances, to cast the enclosing case as a part of the coupling, it may, if desirable, be cast separately, or formed of wrought-metal, where lightness is desired, in which case the joint would be of a spherical form, and the case secured to the parts by bolts or rivets, or it may be left loose about the joint, as its form would prevent slipping out of place.

To enable others skilled in the art to understand my invention, I will describe its construction and operation.

Figure 1 is a side view of my improved coupling.

Figure 2 is a sectional view, taken diametrically through the coupling.

Figures 3, 4, and 7, are sectional views of the different parts of the coupling separated.

Figures 5 and 6 are, respectively, end and side views of the central portions of the coupling.

Figures 8 and 9 are side views of the bearings or driving-pins of the coupling.

The coupling which I have represented in the accompanying drawings consists of two forks, A and B, connected and held in their respective positions by the centre-piece or cross C, and driving-pins D E.

Between, and connecting the bearings of A, I cast a spherical case, $a$, of sufficient internal diameter to receive the fork B, and of suitable thickness to withstand blows it will be likely to receive in use.

There is also a case, $b$, extending between the bearings of B, but not to the extent of $a$, as space must be left for the articulations of the bearings of A.

The centre-piece C is cast with openings through it, in the same plane, at right angles with each other, for the reception of the pins D E.

One of the pins D is somewhat larger than the other, which passes through it and its extremities, riveted upon A, thus securing all the parts together.

Both the parts A and B are cast with tubular sleeves, which receive the ends of the shafting to be coupled.

Having described my invention,

What I claim as new, and desire to secure by Letters Patent, is—

The case $a$ $b$, extending between the bearing-points of A and B, substantially as described.

SETH WHEELER.

Witnesses:
AUGUSTUS H. WALSH,
E. T. MARTIN.